United States Patent
Frey, Jr.

(10) Patent No.: US 9,857,198 B2
(45) Date of Patent: Jan. 2, 2018

(54) APPARATUS AND METHOD FOR INERTIAL SENSOR CALIBRATION

(71) Applicant: BAE Systems Information and Electronic Systems Integrations Inc., Nashua, NH (US)

(72) Inventor: Robert D. Frey, Jr., Bolton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 202 days.

(21) Appl. No.: 15/015,832

(22) Filed: Feb. 4, 2016

(65) Prior Publication Data

US 2016/0223357 A1     Aug. 4, 2016

Related U.S. Application Data

(60) Provisional application No. 62/111,823, filed on Feb. 4, 2015.

(51) Int. Cl.
    *G01C 25/00*     (2006.01)
    *G01P 21/00*     (2006.01)
    *G01P 15/14*     (2013.01)

(52) U.S. Cl.
    CPC .......... *G01C 25/005* (2013.01); *G01P 15/14* (2013.01); *G01P 21/00* (2013.01)

(58) Field of Classification Search
    CPC ....... G01C 19/04; G01C 25/005; G01P 15/14; G01P 21/00
See application file for complete search history.

(56) References Cited

U.S. PATENT DOCUMENTS

| | | | | |
|---|---|---|---|---|
| 4,461,089 A | * | 7/1984 | Krogmann | G01C 19/38 33/324 |
| 4,686,771 A | * | 8/1987 | Beveventano | G01C 19/38 33/324 |
| 4,883,347 A | * | 11/1989 | Fritzel | F41G 3/225 356/248 |
| 5,922,039 A | | 7/1999 | Welch et al. | |
| 8,146,401 B2 | * | 4/2012 | Frey, Jr. | F41G 7/007 33/323 |

(Continued)

FOREIGN PATENT DOCUMENTS

GB     2345155 B * 4/2003 ............. G01C 21/18

OTHER PUBLICATIONS

Paul G. Savage (SAI), Blazing Gyros—The Evolution of Strapdown Inertial Navigation Technology for Aircraft, "Journal of Guidance, Control, & Dynamics" vol. 36, No. 3, May-Jun. 2013, pp. 637-655.

(Continued)

*Primary Examiner* — David A Rogers
(74) *Attorney, Agent, or Firm* — Scott J. Asmus

(57) ABSTRACT

An inertial sensor system according to one embodiment having a platform with an x axis and a y axis, a rotational table that is free to rotate about the x axis, a rotational table gyroscope mounted onto the rotational table to measure p, q, and r rotation rates referenced to the rotational table and at least one platform gyroscope mounted off the rotational table, wherein the rotational table gyroscope and the platform gyroscope provide sense rotation used to process gyroscope biases that are used to correct measurements for the inertial sensing system.

16 Claims, 4 Drawing Sheets

(56) References Cited

U.S. PATENT DOCUMENTS

| | | |
|---|---|---|
| 8,464,433 B1 | 6/2013 | Cardarelli |
| 2011/0167893 A1* | 7/2011 | Frey, Jr. .................. F41G 7/007 73/1.77 |
| 2016/0177704 A1* | 6/2016 | Van Steenwyk ...... E21B 47/024 166/255.2 |

OTHER PUBLICATIONS

MinIM® MEMS Inertial Measurement Unit. Datasheet [online]. UTC Aerospace Systems, 2014 [retrieved on Feb. 4, 2016]. Retrieved from the Internet: http://utcaerospacesystems.com/cap/systems/sisdocuments/Guidance,%20Navigation%20and%20Control%20(GNC)/MinIM%20MEMS%20Inertial%20Measurement%20Unit.pdf.

SiIMU02® MEMS Inertial Measurement Unit. Datasheet [online]. UTC Aerospace Systems, 2014 [retrieved on Feb. 4, 2016]. Retrieved from the Internet: http://utcaerospacesystems.com/cap/systems/sisdocuments/Guidance,%20Navigation%20and%20Control%20(GNC)/SiIMU02%20MEMS%20Inertial%20Measurement%20Unit.pdf.

* cited by examiner

300

| Rotating at least one gyroscope on a turntable relative to at least one additional gyroscope off the turntable | 310 |

| Measuring rotation rates of the gyroscopes and rotational angle of the turntable | 320 |

| Using sense rotation rates and angles, processing for the biases of the gyroscopes | 330 |

| Optionally performing post-processing to remove noise/errors using an estimator | 340 |

| Removing the biases from the gyroscope measurement data | 350 |

FIGURE 3

APPARATUS AND METHOD FOR INERTIAL SENSOR CALIBRATION

CROSS-REFERENCE TO RELATED APPLICATIONS

This application claims the benefit of U.S. Provisional Patent Application No. 62/111,823, filed on Feb. 4, 2015, which is herein incorporated by reference in its entirety.

FIELD OF THE DISCLOSURE

The disclosure relates to inertial sensors and more particularly to improved systems and techniques for calibrating inertial sensors such as rotation and motion sensors.

BACKGROUND

Inertial sensors are devices such as gyroscopes and accelerometers that have numerous applications in processing orientation, direction, velocity and/or positional information without using an external reference. Some applications include navigation and identifying orientation/direction in rockets, missiles, aircraft, vessels and vehicles as well as many consumer and commercial products like those in the gaming industry.

As the size and cost of inertial sensors have decreased, they have been widely adopted. As an example of usage, inertial navigation systems, inertial measurement units and inertial guidance systems typically include multiple gyroscopes and accelerometers that enable measurement of heading and orientation well as motion change along multiple axes. Such systems are used, for example, in airplane/vessel navigation, missile guidance and unmanned aerial vehicle stabilization. Some gyroscopes are composed of mechanical components while other gyroscopes can be at least partially implemented electronically, such as by using microelectromechanical systems (MEMS).

One of the limitations in the application of inexpensive gyroscopes is the errors that affect the inertial sensor measurements such as gyroscope bias, accelerometer scale error and vibration rectification coefficients. As an example, there is uncertainty in the bias values for gyroscopes as they cycle from turn-on to turn-on. Such bias affects the accuracy and limits the usefulness of the measured signals and the ensuing applications. One prior solution to bias uncertainty was to place the system into a non-rotational environment to allow the bias to be measured prior to operation of the system. For this initialization process, the system is not rotating and any sensed rotation must be the bias and thus can be removed during processing. For certain applications, such as moving vehicles/vessels and airborne assets, such an initialization environment cannot be easily provided. There is a need, therefore, for a system and method in which the gyroscope bias and other inertial sensor errors can be determined in a dynamic or moving environment. Any such solution opens up the potential to use inexpensive gyroscopes in further applications and with greater accuracy.

SUMMARY

One example embodiment of the present disclosure provides an inertial sensor system, comprising a platform having an x axis and a y axis, a rotational table coupled to the platform wherein the rotational table is configured to rotate about the x axis of the platform. There is at least one rotational table gyroscope coupled to the rotational table and at least one platform gyroscope coupled to the platform, wherein the rotational table gyroscope and the platform gyroscope provide sense rotation used to process gyroscope biases that are used to correct measurements for the inertial sensing system.

A method for providing inertial sensor measurements, including rotating at least one gyroscope on a turntable relative to at least one additional gyroscope off the turntable, measuring sense rotation rates for the gyroscope on the turntable, sense rotation rates for the gyroscope off the turntable, and the rotational angle of the turntable. The method also includes using the same rotation rates and the rotational angle, and processing for biases of the gyroscopes on the turntable and biases of the gyroscopes off the turntable as well as removing the biases from the inertial sensor measurements.

An inertial sensor, comprising a platform having an x axis and a y axis with a rotational table coupled to the platform wherein the rotational table is configured to rotate about the x axis of the platform. There is at least one rotational table gyroscope coupled to the rotational table and at least one platform gyroscope coupled to the platform. At least one accelerometer is coupled to the rotational table or the platform. There is a processing unit for processing biases of the platform gyroscope and rotational table gyroscope and acceleration scale error and/or vibration rectification coefficients of the accelerometer.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 3 is a flowchart of a calibration technique for the inertial sensor according to one embodiment.

DETAILED DESCRIPTION

According to one embodiment, the inertial sensor system includes one or more gyroscopes coupled to a rotational table and one or more additional gyroscopes are coupled to a non-rotating platform. At least one of those gyroscopes serves as a reference gyroscope with the two sets of gyroscopes employing differential or sensor motion to calibrate each other. A further embodiment employs accelerometers mounted to the rotational table and/or the non-rotating platform. In one example the calibration is independent of the common environment. The inertial sensor measurements are thus correctable for bias, scale factor and other errors to provide improved measurements used to provide more accurate orientation, navigation and/or direction solution data. As used herein, gyroscope shall refer to any of the devices that are used to provide orientation that is used for direction, stability, navigation, and related applications. By way of non-limiting example, the gyroscopes in one example are microelectromechanical system (MEMS) devices. Accelerometers are any of the devices capable of measuring proper accelerations such as g-force. The examples herein, describe the inertial sensor systems having various configurations of gyroscope and accelerometers along with various techniques for the calibration to provide accurate measurement data.

Figure 1:
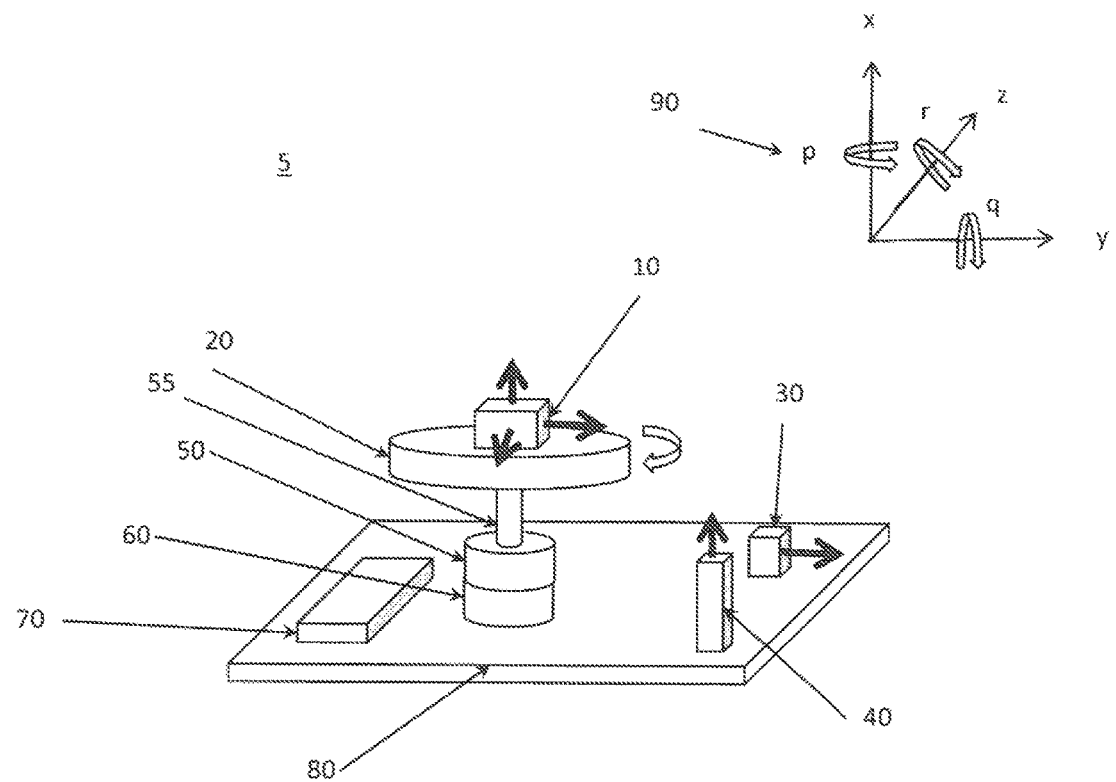
FIG. 1 is a block diagram of an inertial sensor system configured in accordance with an embodiment.

Referring to FIG. 1, the depicted inertial sensor system 5 includes a gyroscope 10 coupled to a rotational table 20. The term rotational table 20 is used to refer to any platform or surface designed for rotation. The gyroscope 10 in one example is an inertial gyroscope having at least three gyroscopes arranged as a triaxial gyroscope measuring p, q and r rotational rates relative to the rotation table 20. The one or more gyroscopes 10 in one example are MEMS devices and can be integrated as a single package or individual units. The gyroscopes 10 are securable fastened to the rotation table 20 although in one example the devices 10 are detachable to provide for easy replacement. Redundant gyroscopes can also be incorporated to allow for switching from a felled or faulty gyroscope, which could be beneficial for critical, applications. In this example, the rotation table 20 is coupled to a motor assembly 50 that provides the rotational force to spin the gyroscopes 10. In one example the motor assembly 50 is a direct drive spinning a shaft 55 that is coupled to the rotational table 20. While shown as a separate unit, the motor assembly 50 and rotation table in one example are integrated and does not require the shaft.

The rotation table 20 with the motor assembly 50 are coupled to a platform 80, where the motor assembly 50 is used to control the rotation of the rotation table 20. The platform 80 can be sized according to the design criteria to hold the various components and is typically rigid enough to prevent unnecessary vibration or flexing. In one example the platform 80 is free rotate and translate. The platform 80 in one example provides for electrical and communication signals via electrical connectors and cables. The platform 80 can also form the base for the housing that encapsulates the sensor system 5.

At least one reference gyroscope 30 is also mounted to the platform 80 and for this example, aligned to the y axis of the platform referenced coordinate system 90. It should be understood that the reference coordinate system is used for illustrative purposes to indicate orientation reference only. The entire inertial sensor system 5 can fee packaged using standard techniques with the housing enclosing the components into an integrated device.

There are a number of techniques to measure the rotation angle. In one example the motion is controlled to a constant inertial rate using the p gyroscope in gyroscope 10. According to one embodiment, the table position 20 and rate relative to the platform 80 is measured using an angle feedback device 60. This angle feedback device 60 may be a resolver, encoder, potentiometer or other rotational measurement device. The resolver is used in one example as it provides highly accuracy rotational velocity measurement. In a further embodiment the data from the motor is used to calculate the rotation angle.

The p rotational rate of the platform 80 is dependent on both the rotational rate measured by the p gyroscope of the gyroscope 10 and the rotational rate measured by the angle feedback device 60. Requirements for p rate accuracy of the platform are used for the selection of the angle feedback device 60 rate measurement.

The measurements of acceleration by one or more accelerometers 40, the table angle relative to platform 60, reference gyroscope 30 and the gyroscope 10 as well as gyroscope p, q and r rates are provided to the processor 70 in order to estimate the gyroscope biases.

By way or illustration, in one example there are three gyroscopes mounted as a triaxial cluster on the rotating table such that fee gyroscopes are orthogonal to each other. The biaxial cluster is mounted onto the rotational table that is free to rotate about the x axis. Rotation rates about x, y and z are referred to a p, q and r respectively. The triaxial gyroscopes measure the p, q and r rotation rates referenced to the rotational table. A minimum of one additional reference gyroscope is mounted off the rotational table. Givers relative motion of the rotational table with respect to the "non-rotating" reference gyroscope, the q and r bias of the gyroscopes on the rotating table and the bias of the non-rotating reference gyroscope is determined.

Figure 2:
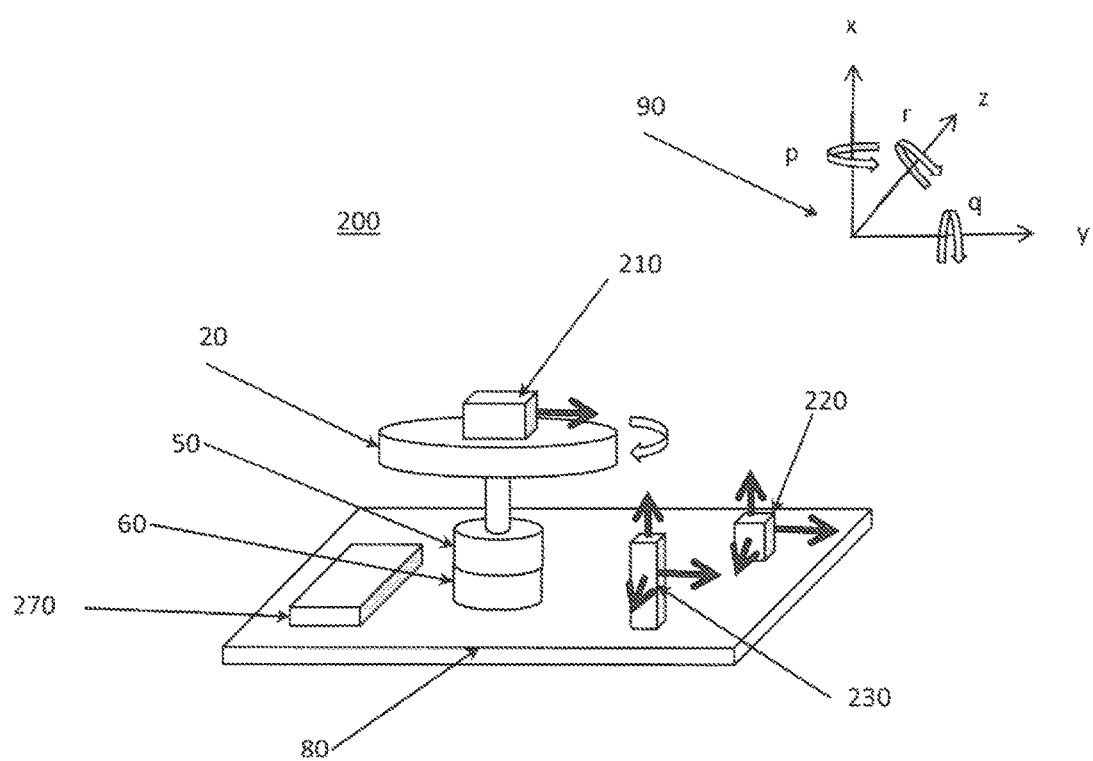
FIG. 2 is a perspective view of another inertial sensor system configured in accordance with a further embodiment.

Another embodiment of the inertial sensor system 200 is shown in FIG. 2. In this example, one or more reference gyroscopes 210 are mounted on the rotational table 20 and the additional gyroscopes 220 are mounted to the platform 80. In this example the triaxial cluster of gyroscopes 220 is mounted to the platform 80.

In a further embodiment the rotational table 210 is stationary in inertial space and the platform 80 rotates in inertial space. One feature is to have relative rotational motion between the gyroscopes 210, 220 to provide for differential sense rotation. The relative motion of the table 20 and the platform 80 in this example is controlled using the motor 50.

One or more accelerometers 230 are be mounted either to the platform 80 or the rotation table 20 in order to measure x-acceleration in high 'g' environments in order to compensate for g-sensitivity of the gyroscopes. The accelerometers 230 in one example is used for detecting acceleration (g-force), as well as changes in tilt or movement in a certain direction, including the ability to measure vibrations. Multiple accelerometers 230 such as shown allow for the measurements in more than one axis or direction. While depicted as multiple accelerometers 230 in a single package, these can also be individual accelerometers placed within the inertial sensor system 200. As with the gyroscopes, the accelerometer bias and scale factor can also be determined using the same methods used to estimate the gyroscope bias and gyroscope g-sensitivity.

In this example the system 200 includes a communications unit 270 such as a transceiver for transmitting data to a processing section that is off the system.

Referring to FIG. 3, a method of calibration 300 of the inertial sensor system according to one example is depicted. The method entails providing at least one gyroscope on a rotating reference or turntable with at least one additional gyroscope located off the turntable 310. Such a system is depicted in FIGS. 1 and 2, where the elements are coupled to a platform. Measuring the rotation rates of the gyroscopes on the non-rotating platform, rotation rates of the gyroscopes on the turntable, and the angle of the turntable 320. Processing the bias values 330 using the sensed rotation rates for the gyroscope on the turntable, the sensed rotation rates for the gyroscope on the non-rotating platform, and the rotational angle of the turntable.

In one embodiment there may be noise and error terms and the processing can include an estimator to improve the bias value measurement 340. The estimator in one example is a least square estimator. A recursive least square estimator can be used to provide a continuously improving estimate dependent on the temporal behavior of the error sources. If the bias values have variation with time, then a Kalman estimator can be used for the solution of the time varying bias values. The state model defined in equation 12 is appropriate for any of these implementations. The output of the estimator will be bias estimates for bias b1, b2 and b3. These estimated bias values are used to correct the gyroscope outputs and thereby improve the measurements.

In one implementation in a dynamic accelerating environment, the bias estimator performance may be significantly degraded due to the linear acceleration sensitivity and/or the vibration rectification effects. Further post processing can include the implementation of state equations for an estimator that will produce estimates for the gyroscope biases, accelerometer scale error and vibration rectification coefficients. These estimates are then used to improve the measurements.

Figure 4:
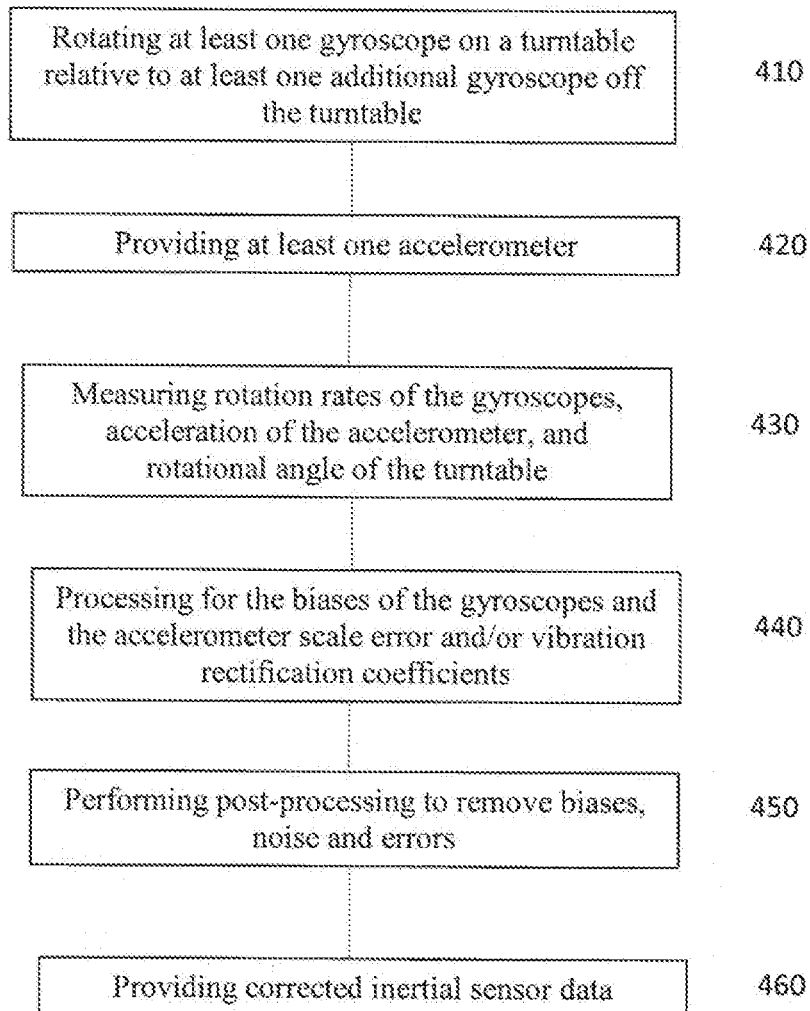
FIG. 4 is a flowchart of a further calibration technique according to another embodiment These and other features of the present embodiments will be understood better by reading the following detailed description, taken together with the figures herein described. The accompanying drawings are not intended to be drawn to scale. For purposes of clarity, not every component may be labeled in every drawing.

Referring to FIG. 4, a further embodiment involves providing at least one gyroscope on a rotating turntable, and at least one additional gyroscope off the turntable on a non-rotating reference 410 as well as providing at least one accelerometer 420. The accelerometer can be a single device measuring a single axis for acceleration along a direction of primary acceleration or two or more accelerometers measuring additional axes for acceleration. The accelerometers can be mounted on the rotating turntable or the non-rotating platform.

The method includes measuring rotation rates of the gyroscopes, acceleration of the accelerometers, and the rotational angle of the turntable 430. The biases of the gyroscopes is processed and the accelerometer scale error and/or vibration rectification coefficients can also be processed 440 as required. Post-processing is done to remove the biases, errors and noise 450 from the inertial sensor system measurements. The inertial sensor measurements such as the corrected gyroscope and accelerometer measurements are provided for the intended end use 460.

According to one embodiment, for systems with high rotational dynamics about the spin axis, the rotation rate of the rotating table relative to inertial space is controlled to a low inertial spin rate. This eliminates or minimizes issues with alignment tolerances in the gyroscope packages. In one example, a platform mounted gyroscope is set to measure rotations about the y axis. The platform operates at x-axis spin frequencies of 35 Hz. Given the gyroscope has a dynamic range constraint of 5 rad/sec, it will saturate if the gyroscope sense axis is mounted at an angle greater than a $\sin(5/(2\pi 35)) = 0.0227$ degrees relative to the platform y-axis due to coupling with the x-axis. If the sensitive gyroscope is mounted to the rotating table and the rotation speed controlled to a slow inertial rate, the mounting tolerance of the sensitive gyroscope can be relaxed. In this case the reference gyroscope that is mounted to the platform y axis is selected to have a high dynamic range that accounts for mounting tolerance relative to the high spin rate axis.

In a further example, the gyroscope measurements orthogonal to the x axis from, the rotating table are measuring table referenced rotational rates identified as $g_1$ and $g_2$. They relate to the platform referenced q and r rates through equations 1 and 2. The angle, $\theta$, is the angle of rotation of the table relative to the platform as reported by the angle feedback device.

$$g_1(t) = q(t)\cos(\theta) + r(t)\sin(\theta) \quad (1)$$

$$g_2(t) = -q(t)\cos(\theta) + r(t)\sin(\theta) \quad (2)$$

The actual measurements include an unknown bias, $b_1$ and $b_2$, and measurement errors generally classed as measurement noise, $n_1$ and $n_2$. Equations 3 and 4 represent a model of the gyroscope measurement with the bias and noise terms.

$$g_{m1}(t) = g_1(t) + b_1 + n_1 \quad (3)$$

$$g_{m2}(t) = g_2(t) + b_2 + n_2 \quad (4)$$

The platform reference gyroscope measures the q rate of the platform with a bias error $b_3$ and a measurement noise $n_3$ and is modeled as shown in equation 5.

$$q_{rm}(t) = q(t) + b_3 + n_3 \quad (5)$$

The platform referenced q rate can be determined from $g_1$ and $g_2$ using the relative angle between the table and the platform, $\theta$, as shown in equation 6.

$$q(t) = g_1(t)\cos(\theta(t)) - g_2(t)\sin(\theta(t)) \quad (6)$$

The measurement of q can be calculated from the measurements of the two spinning gyroscopes using the following equation:

$$q_m(t) = g_{m1}(t)\cos(\theta(t)) - g_{m2}(t)\sin(\theta(t)) \quad (7)$$

Substituting equations 3 and 4 directly relates the actual rotational rates and the unknown bias and noise to the "measurement" of platform rate q:

$$q_m(t) = [g_1(t) + b_1 + n_1]\cos(\theta(t)) - [g_2(t) + b_2 + n_2]\sin(\theta(t)) \quad (8)$$

Substituting equations 1 and 2 and rearranging results in equation 9. The noise $n_5$ is a combination of the noises $n_1$ and $n_2$ $$q_m = q + b_1\cos(\theta) - b_2\sin(\theta) + n_5 \quad (9)$$

The reference gyroscope measures platform q rate with added bias, $b_3$, and noise $n_3$, as described in equation 10

$$c_m(t) = q(t) + b_3 + n_3 \quad (10)$$

Combining equation 10 and equation 9 and rearranging results in equation 11 which that relates available measurements to unknown bias. The noise terms $n_3$ and $n_5$ are combined to create n6

$$q_m - c_m = -b_3 + b_1\cos(\theta) - b_2\sin(\theta) + n_6 \quad (11)$$

Replacing qm with equation 7, the inertial sensor measurement can be as a state equation with the unknown bias assigned as the states as:

$$g_{m1}\cos(\theta) - g_{m2}\sin(\theta) - c_m = [\cos(\theta) \ -\sin(\theta) \ -1]\begin{bmatrix} b_1 \\ b_2 \\ b_3 \end{bmatrix} + n_6 \quad (12)$$

If the noise terms represented in composite noise $n_6$ are zero and the bias terms are static, the bias can be solved for directly, given three measurements at unique relative rotations of the table. For static bias terms in the presence of noise, a least square estimator will provide the optimum measure of the bias values. A recursive least square estimator will provide a continuously improving estimate dependent on the temporal behavior of the error sources represented by $n_6$. If the bias values have variation with time, then a Kalman estimator is a more appropriate for optimum solution of the time varying bias values. The state model defined in equation 12 is appropriate for any of these implementations. The output of the estimator will be bias estimates for bias $b_1$, $b_2$ and $b_3$. These estimated bias values are used to correct the gyroscope outputs and thereby improve the measurements.

When implemented, observation of estimator performance as error sources are added and may lead to the incorporation of additional states to improve performance. For instance, in one implementation using MEMS gyroscopes in a dynamic accelerating environment, the bias estimator performance was significantly degraded due to the linear acceleration sensitivity of the device as well as the vibration rectification effect (sensitivity to $g^2$) due to rocket motor acceleration and deceleration due to drag. Both of these effects are along the x axis. These terms are added to the gyroscope measurement model as indicated in equations 13 through 15.

$$g_{m1}(t)=g_1(t)+b_1+a_1 a_x(t)+a_{s1} a_x^2(t)+n_1 \quad (13)$$

$$g_{m2}(t)=g_2(t)+b_2+a_2 a_x(t)+a_{s2} a_x^2(t)+n_2 \quad (14)$$

$$c_m(t)=q(t)+b_3+a_3 a_x(t)+a_{s3} a_x^2(t)+n_3 \quad (15)$$

The measurement of $a_x$ with bias, $c_1$, and noise, $n_4$, is modeled in equation 16:

$$a_{xm}(t)=a_x(t)+c_1+n_4 \quad (16)$$

Generally, the low accelerometer bias, $c_1$, is inconsequential and is grouped into the noise term $n_4$ in equation 17 in order to simplify the derivation.

$$a_{xm}(t)=a_x(t)+n_4 \quad (17)$$

Performing similar steps as applied to equations 1 through 12 leads to the following state equation:

$$m = HX \quad (18)$$

Where $$m = g_{m1}\cos(\theta) - g_{m2}\sin(\theta) - c_m - n_7 \quad (19)$$

$$H = [\cos(\theta) \quad -\sin(\theta) \quad -1 \quad a_{xm}\cos(\theta) \quad -a_{xm}\sin(\theta) \quad -a_{xm} \quad a_{xm}^2\cos(\theta) \quad -a_{xm}^2\sin(\theta) \quad -a_{xm}^2] \quad (20)$$

$$X = \begin{bmatrix} b_1 \\ b_2 \\ b_3 \\ a_1 \\ a_2 \\ a_3 \\ a_{s1} \\ a_{s2} \\ a_{s3} \end{bmatrix} \quad (21)$$

These state equations form the basis for a least square estimator that will produce estimates for the gyroscope biases ($b_1$, $b_2$, $b_3$), accelerometer scale error ($a_1$, $a_2$, $a_3$) and vibration rectification coefficients ($a_{s1}$, $a_{s2}$, $a_{s3}$). These estimates are used to improve the measurement of the platform referenced body rate as described in the following equations thereby providing the improved inertial sensor measurements:

$$\hat{g}_1(t)=g_{m1}(t)-\hat{b}_1-\hat{a}_1 a_{xm}(t)-\hat{a}_{s1} a_{xm}^2(t) \quad (22)$$

$$\hat{g}_2(t)=g_{m2}(t)-\hat{b}_2-\hat{a}_2 a_{xm}(t)-\hat{a}_{s2} a_{xm}^2(t) \quad (23)$$

$$\hat{q}(t)=\hat{g}_1(t)\cos(\theta(t))-\hat{g}_2(t)\sin(\theta(t)) \quad (24)$$

$$\hat{r}(t)=\hat{g}_1(t)\sin s(\theta(t))+\hat{g}_2(t)\cos(\theta(t)) \quad (25)$$

A technical effect of the present system is improved inertial sensor measurements for orientation and/or direction, in one example the system for gyroscope bias estimation comprises a platform with a rotational table that is free to rotate about the platform and having a rotating gyroscope mounted onto the rotational table to measure p, q, and r rotation rates referenced to the rotational table and at least one reference gyroscope mounted off the rotational table; and by measuring the relative motion of the rotational table and platform, the q and r bias of the rotating gyroscopes and the bias of the reference gyroscope can be determined.

There are numerous applications where the systems and techniques described herein can be deployed. Airborne assets, such as UAVs, helicopters, planes, rockets, missiles, are examples where there is generally no simple initialization with a stationary reference and these assets would benefit from the improved accuracy of the present system. Other moving objects that lack a robust reference scheme are further applications that can utilize the techniques provided herein.

In a vehicle example, the improved inertial sensor system provides improved accuracy that aids in the vehicle management and accident prevention, including deployment in the driver-less vehicles. For missiles, the improved accuracy enhances the likelihood of target acquisition. Drones and UAV's that utilize the improved data can have greater stability and more accurate flight paths.

While the present invention has been described, in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. An inertial sensor system, composing:
   a platform having an x axis and a y axis;
   a rotational table coupled to the platform wherein the rotational table is configured to rotate about the x axis of the platform;
   at least one rotational table gyroscope coupled to the rotational table; and
   at least one platform gyroscope coupled to the platform, wherein the rotational table gyroscope and the platform gyroscope provide sense rotation used to process gyroscope biases that are used to correct measurements for the inertial sensing system.

2. The inertial sensor system of claim 1 wherein at least some of the gyroscopes are micromechanical system (MEMS) devices.

3. The inertial sensor system of claim 1 further comprising a motor assembly coupled between the platform and the rotational table, wherein the motor assembly rotates the rotational table.

4. The inertial sensor system of claim 1 further comprising an angle feedback device measuring a rotational table position and rate relative to the platform.

5. The inertial sensor system of claim 4 wherein the angle feedback device is selected from the group consisting of a resolver, encoder, or potentiometer.

6. The inertial sensor system of claim 1 wherein the at least one rotational table gyroscope is a triaxial cluster comprising three gyroscopes orthogonal to each other.

7. The inertial sensor system of claim 1 wherein the at least one platform gyroscope is a triaxial cluster comprising three gyroscopes orthogonal to each other.

8. The inertial sensor system of claim 1 further comprising at least one processor, wherein the processor determines at least one bias of the platform gyroscope and the rotational table gyroscope.

9. The inertial sensor system of claim 8 further comprising at least one post-processing section, wherein the post-processing section employs an estimator to remove noise from the gyroscopic measurements.

10. The inertial sensor system of claim 9 wherein the estimator is selected from the group consisting of least square estimator, recursive least square estimator, and Kalman estimator.

11. The inertial sensor system of claim 1 further comprising at least one communications unit for communicating the measurements.

12. The inertial sensor system of claim 1 further comprising at least one accelerometer providing acceleration measurements for the inertial sensing system.

13. The inertial sensor system of claim 1 wherein the gyroscope is deployed on airborne assets.

14. A method for providing inertial sensor measurements, comprising:
   rotating at least one gyroscope on a turntable relative to at least one additional gyroscope off the turntable;
   measuring sense rotation rates for the gyroscope on the turntable, sense rotation rates for the gyroscope off the turntable, and the rotational angle of the turntable;
   using the sense rotation rates and the rotational angle, processing for biases of the gyroscopes on the turntable and biases of the gyroscopes off the turntable; and
   removing the biases from the inertial sensor measurements.

15. The method for providing inertial sensors according to claim 14, further comprising providing at least one accelerometer, measuring acceleration of the accelerometer, processing for accelerometer scale error and/or vibration rectification coefficients, and removing the accelerometer scale error and/or the vibration rectification coefficients from the inertial sensor measurements.

16. An inertial sensor, comprising:
   a platform having an x axis and a y axis;
   a rotational table coupled to the platform wherein the rotational table is configured to rotate about the x axis of the platform;
   at least one rotational table gyroscope coupled to the rotational table;
   at least one platform gyroscope coupled to the platform;
   at least one accelerometer coupled to the rotational table or the platform; and
   a processing unit for processing biases of the platform gyroscope and rotational table gyroscope and acceleration scale error and/or vibration rectification coefficients of the accelerometer.

* * * * *